Oct. 9, 1973   H. HEIMBERGER   3,764,437
METHOD OF MAKING WATERPROOF SLIDE-FASTENER STRINGER
Filed Aug. 14, 1970   2 Sheets-Sheet 2

HELMUT HEIMBERGER
*INVENTOR.*

BY  *Karl F. Ross*

ATTORNEY

United States Patent Office 3,764,437
Patented Oct. 9, 1973

3,764,437
METHOD OF MAKING WATERPROOF SLIDE-FASTENER STRINGER
Helmut Heimberger, Grenzach, Germany, assignor to Opti-Holding AG, Glarus, Switzerland
Filed Aug. 14, 1970, Ser. No. 63,890
Int. Cl. A44b *19/32;* B32b *31/00*
U.S. Cl. 156—306    3 Claims

ABSTRACT OF THE DISCLOSURE

The two halves of a slide-fastener stringer are separated and each half is meshed with one side of a heat-resistant form strip consisting of an endless base strip carrying on each of its edges an endless coil meshable with the stringer halves. A thermally bondable elastomeric band is laid over each half and bonded thereto in a heated press. Then the halves are detached from the form strip and again reunited. The pressing operation also forms a tight sealing lip on the edge of the waterproofing band.

(1) FIELD OF THE INVENTION

The present invention relates to a method of making waterproof slide fasteners. More particularly this invention concerns a method of making the stringers for such slide fasteners.

(2) BACKGROUND OF THE INVENTION

A slide fastener is usually made waterproof by providing a stringer, the support tapes complete with coupling coils, with tight seals which snugly engage each other to prevent liquid from passing through the fastener.

One method of mounting this waterproof seal is to simply glue it on top of the stringer. Such a method is slow so that it is not applicable to mass production of inexpensive fasteners. In another method the seal is extruded around the coil by an injection molding press. A thermoplastic material, generally a synthetic resin, must be used for this latter method, thereby making the finished fastener heat-sensitive.

Generally speaking, the best waterproof slide fasteners should have standard high-quality synthetic-resin coils mounted on textile support tapes, with an elastomeric seal overlying the combination.

(3) OBJECTS OF THE INVENTION

It is an object of the present invention to provide an improved method of making a slide-fastener stringer for waterproof slide fasteners as described above.

Another object is to provide a method of making such a stringer and a special device for carrying out this method.

(4) SUMMARY OF THE INVENTION

The above objects are obtained by a method wherein the stringer halves are interdigital with a reusable heat-resistant form strip having coupling head meshingly engageable with the heads of the halves. Then a thermally bondable band is juxtaposed with each stringer half, and the two are bonded together in a press. Thereafter the two stringer halves with the waterproofing bands bonded thereon are separated from the form strip and intergidital with each other. This process can be carried out continuously, i.e. with a roller press. According to another feature of the invention, the method is carried out in steps in a flat press whose length just corresponds to the length of the slide fasteners to be made. This is advantageous since slide-fastener stringers are often formed with the end members of the fasteners, only needing subdivision and mounting of the sliders.

The apparatus for carrying out this method consists of means for interleaving the stringer halves with the form strip, means for juxtaposing the bands with the halves, means for thermally bonding the bands and halves, and means for separating the halves from the form strip. Further means is provided to join the two stringer halves together, and means is provided if necessary to separate the joined stringer halves prior to interleaving with the form strip. Both halves are treated simultaneously.

According to another feature of this invention the form strip comprises an endless textile tape and, on each edge thereof, an endless coupling coil, and the apparatus includes guide means for advancing this loop through the press.

In accordance with yet another feature this form strip is heat resistant and used as a die so that, as the waterproofing bands are applied to the stringer halves, it forms small sealing lips on the edges of the bands which butt in the finished fastener to form a tight seal.

(5) DESCRIPTION OF THE DRAWINGS

The above and other objects, features, and advantages will become more apparent from the following description, reference being made to the accompanying drawing, in which:

FIG. 1A is a detail view showing an alternative embodiment of the apparatus of FIG. 1;

(6) SPECIFIC DESCRIPTION AND EXAMPLE

Figure 1:
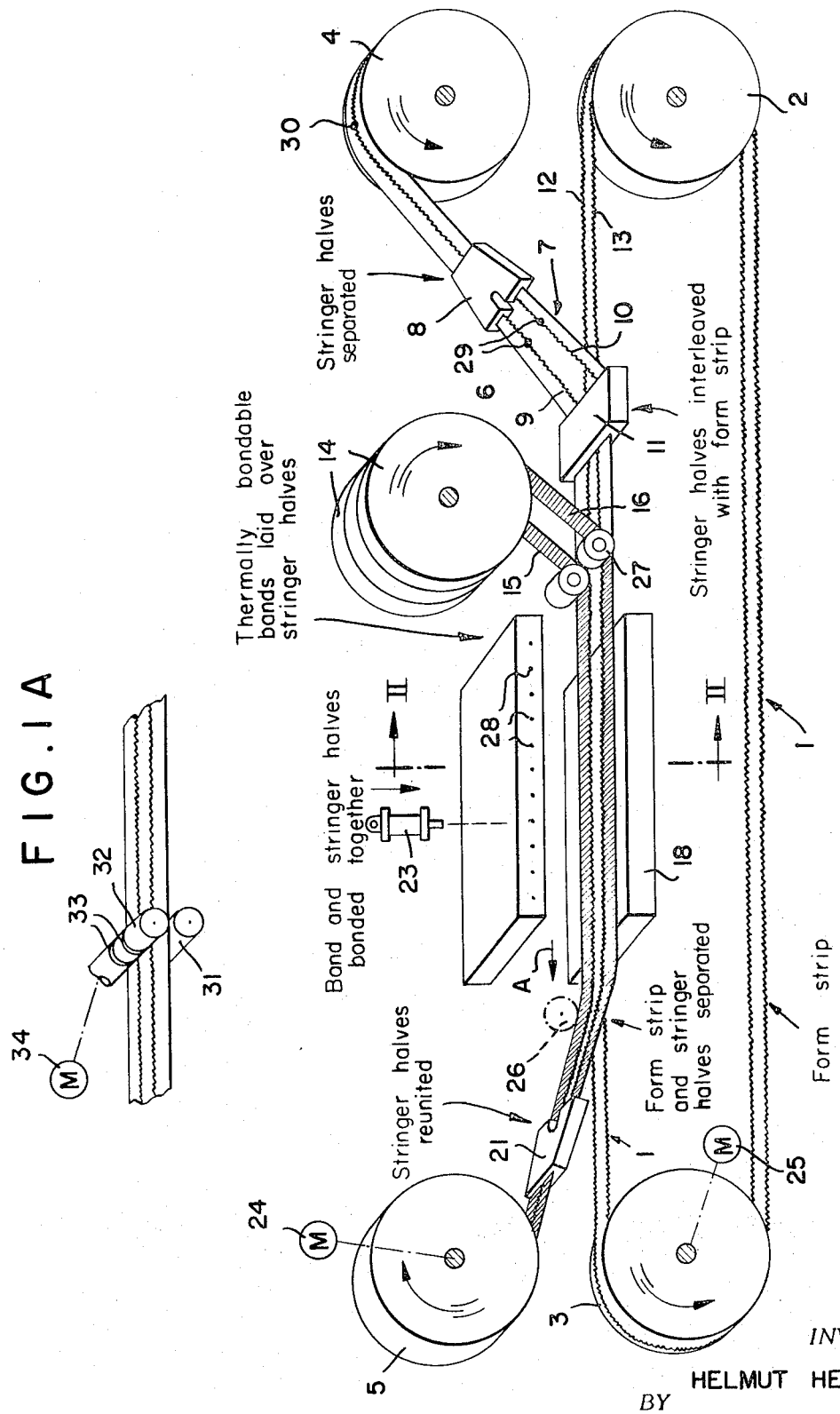
FIG. 1 is a perspective view, partly diagrammatic, showing the apparatus for carrying out the method of the present invention.
Figure 2:
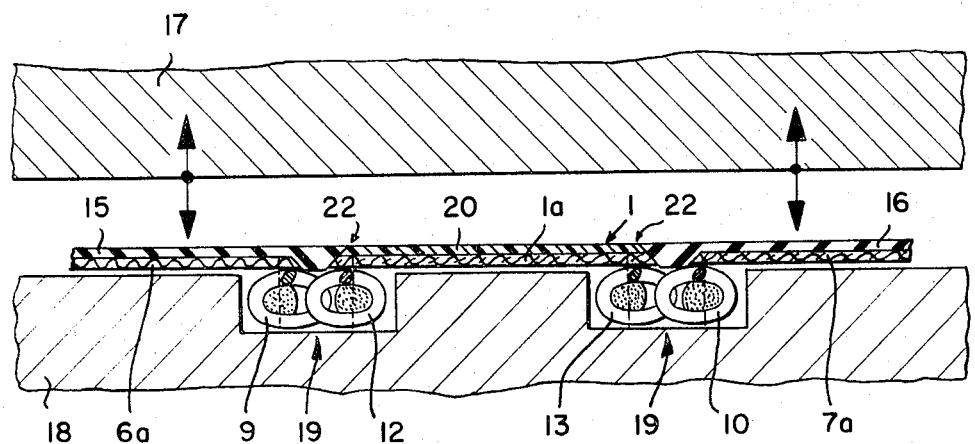
FIG. 2 is a section take along the line II—II of FIG. 1.
Figure 3:
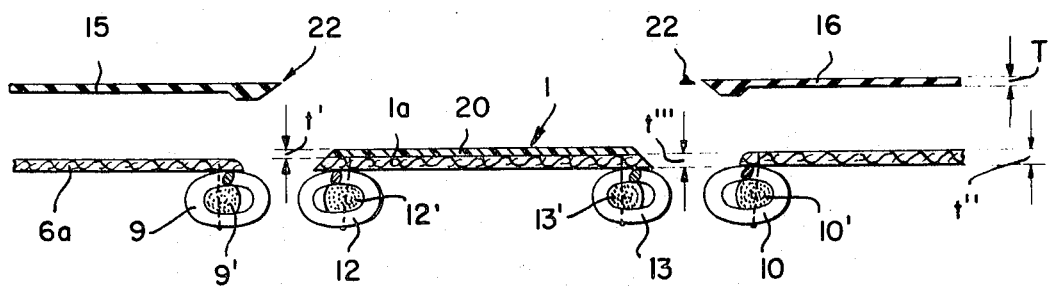
FIG. 3 is an exploded transverse sectional view of the form strip with a finished stringer before its halves are rejoined after pressing.

As shown in FIGS. 1–3, the form strip 1 is spanned between two pulleys 2 and 3, the downstream pulley 3 (relative to the transport direction shown by arrow A) being driven by a motor 25. A slide fastener stringer having halves 6 and 7 is passed from a supply reel 4 through the apparatus to a takeup reel 5 powered by a motor 24. The stringer 6, 7 comprises a pair of textile support tapes 6a and 7a each carrying a respective synthetic-resin coupling coil 9 and 10 held in place by stitching through respective filler cords 9' and 10'. The stringer halves 6 and 7 are subdivided into sections intended to make up the eventual separate slide fasteners, once equipped with sliders etc. These sections are shown at 29 and 30, which correspond to regions where the coils have been formed into end stop members and the like.

The stringer halves 6 and 7 are separated from each other in a block 8 acting much as a conventional slide-fastener slider, then are digitates (meshed) with the form strip by another block 11 which once again functions much like the usual slider. The form strip 1 comprises a generally trapezoidal central textile strip 1a bearing on its wide face (underside in FIG. 3) at its edges a pair of coupling elements 12 and 13 held in place by stitching through their respective filler cards 12' and 13'. These elements 12 and 13 conform exactly to the coils 9 and 10 and mesh perfectly therewith. The textile strip 1a is coated on its narrow face with an antiadhesive elastomer coating 20.

A pair of supply reels 14 feed a pair of identical thermally bondable elastomeric bands 15 and 16 under rollers 27 onto the stringer halves 6 and 7 downstream of the slide block 11. These rubber bands 15 and 16 are of substantially regular cross section and are of a thickness T which is equal to the thickness $t'$ of the coating 20, whereas the thickness t'' of the support tapes 6a and 7a and the thickness t''' of the band 1a are equal. In this manner the coats 9 and 10 are prevented from being deformed during pressing.

Figure 4:
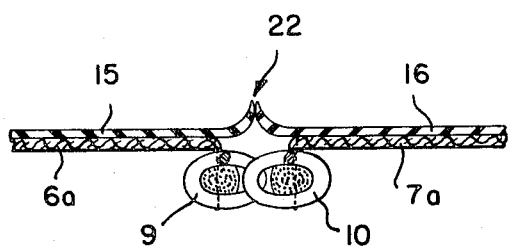
FIG. 4 shows the finished product in a transverse sectional view.

A heated platen-type press having a lower fixed platen 18 and an upper movable platen 17 is provided downstream of the rollers 27. The upper platen is vertically displaceable under the effect of a hydraulic cylinder 23 and is provided with heating wires 28. As shown best in FIG. 2, the lower platen 18 is provided with a pair of grooves 19 adapted to snugly receive the interleaved coils 9, 12, and 10, 13. Thus, when the two press platens 17 and 18 come together over the combined stringer halves 6 and 7 covered by the bands 15 and 16 and coupled to the form strip 1, the bands 15 and 16 are effectively thermally bonded thereon, can even be partially liquefied in the case of thermoplastic bonds. At the same time a small sealing lip 22 is formed on the edges of the bands 15 and 16 which overhang the coils 9, 10, 12, and 13. This lip 22 is thicker than the remainder of the bands 15 and 16 and has a sharp edge formed by the beveled edge corresponding to the sides of the trapezoidal base strip 1a. FIG. 4 shows how these lips 22 abut and bend up to make a very tight waterproof seal. Some of the elastomeric bands 15 and 16 is indeed vulcanized and forced into the coils 9 and 10. This action, however, has a very advantageous effect on the eventual waterproof qualities of the fastener, and does not in the slightest hinder opening and closing the same since the material cannot pass into the region between the coupling heads occupied by the heads of the form strip.

The press 17, 18 has a length in the transport direction equal to the distance between the end-stop members as shown at 29 and 30. With carefully synchronized stepping the waterproofing bands are only thermally bonded in those areas of the stringer between these end portions.

As shown in FIG. 1A, instead of the platens 17 and 18 a pair of rolls 31 and 32 can be used. The roll 32 is heated and formed with circumferential grooves 33 corresponding to the grooves 19. This roll 32 is also driven by a motor 34.

When the thermally bonded stringer halves 6 and 7 and bands 15 and 16 leave the press they pass under a roller shown by dot-dash lines 26 where they are separated from the form strip 1. A little further upstream they are reunited by another slider block 21 and thence pass onto the takeup reel 5.

This method of making a slide-fastener stringer for a waterproof slide fastener is extremely simple and rapid. The original stringer 6, 7 need not be specially made, a normal nylon coil stringer is more than sufficient, since even when the original support tapes 6a and 7a are not waterproof, after overlaying with the waterproof elastomeric bands 15 and 16 they are fully waterproof.

I claim:

1. A method of making a waterproof slide-fastener stringer comprising the steps of:
    interleaving a half of a slide-fastener stringer with a reusable heat-resistant form strip having coupling head meshingly engageable with the coupling heads of the half;
    juxtaposing with the stringer half a thermally bondable band;
    thermally bonding said band to said stringer half; and
    separating said half from said form strip.

2. The method defined in claim 1 wherein a pair of such slide-fastener halves are simultaneously interleaved with said form strip, a pair of said bands being thereafter simultaneously juxtaposed therewith and thereafter simultaneously bonded therewith, said halves being thereafter simultaneously separated from said form strip, said method further comprising the step of meshing said halves together after separation from said form strip.

3. The method defined in claim 1, further comprising the step of forming a sealing edge on said band while thermally bonding same to said half.

References Cited

UNITED STATES PATENTS

| 2,718,047 | 9/1955 | Waldes | 156—66 X |
| 2,768,922 | 10/1956 | Klein | 156—66 |
| 2,903,775 | 9/1959 | Johns | 24—205.16 R |
| 3,417,406 | 12/1968 | Rosenbaum | 24—205 R |
| 3,490,970 | 1/1970 | Heimberger | 156—66 |

ALFRED L. LEAVITT, Primary Examiner

R. A. DAWSON, Assistant Examiner

U.S. Cl. X.R.

24—205.1 R, 205.16 R; 156—66, 152; 161—118, 147, 149